United States Patent
Adams et al.

(10) Patent No.: US 7,860,172 B2
(45) Date of Patent: Dec. 28, 2010

(54) SELF CLOCK GENERATION STRUCTURE FOR LOW POWER LOCAL CLOCK BUFFERING DECODER

(75) Inventors: Chad Adams, Bryon, MN (US); Toru Asano, Austin, TX (US); Andrew Maust, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1326 days.

(21) Appl. No.: 10/845,540

(22) Filed: May 13, 2004

(65) Prior Publication Data

US 2005/0254585 A1 Nov. 17, 2005

(51) Int. Cl.
*H04B 14/04* (2006.01)

(52) U.S. Cl. .................. 375/242; 375/147; 375/262; 375/328

(58) Field of Classification Search .................. 375/242; 365/230.06, 233
See application file for complete search history.

(56) References Cited

U.S. PATENT DOCUMENTS

| | | | | |
|---|---|---|---|---|
| 5,706,232 A | * | 1/1998 | McClure et al. | 365/201 |
| 5,808,959 A | * | 9/1998 | Kengeri et al. | 365/233 |
| 5,852,630 A | * | 12/1998 | Langberg et al. | 375/219 |
| 6,111,808 A | * | 8/2000 | Khang et al. | 365/230.06 |
| 6,252,818 B1 | * | 6/2001 | Voss | 365/230.05 |
| 6,633,508 B2 | * | 10/2003 | Muranaka et al. | 365/230.03 |
| 6,665,231 B2 | * | 12/2003 | Mizuno et al. | 365/233 |
| 6,914,849 B2 | * | 7/2005 | Cao et al. | 365/230.06 |
| 7,450,444 B2 | * | 11/2008 | Demone | 365/194 |
| 2004/0076063 A1 | * | 4/2004 | Dhong et al. | 365/230.05 |

\* cited by examiner

*Primary Examiner*—Shuwang Liu
*Assistant Examiner*—Dhaval Patel
(74) *Attorney, Agent, or Firm*—The Brevetto Law Group

(57) ABSTRACT

A k-to-$2^k$ decoder is provided. Within the final stage of a k-to-$2^k$ decoder is a plurality of word line drivers. These word line drivers utilize clocking signals to fire word lines to a memory array. However, power consumption by clocks has become a serious issue with the increase component density on silicon wafers. To alleviate the problem, signals from the first stage of the k-to-$2^k$ decoder provide enablement signals to Local Clock Buffers (LCBs) that allow the word line drivers to fire. The enablement signal reduces the number of active buffers and signals carried to word line drivers, reducing power consumption.

16 Claims, 4 Drawing Sheets

SELF CLOCK GENERATION STRUCTURE FOR LOW POWER LOCAL CLOCK BUFFERING DECODER

FIELD OF THE INVENTION

The present invention relates generally to decoders and, more particularly, to improving clock generation for lower power consumption.

DESCRIPTION OF THE RELATED ART

In conventional Synchronous Dynamic Random Access Memory (SDRAM), decoders are used in conjunction with sense amplifiers as well as a variety of other devices. Conventional decoders can be two or three stage k-to-$2^k$ decoders.

Referring to FIG. 1 of the drawings, the reference numeral 100 generally designates a conventional k-to-$2^k$ decoder. The conventional k-to-$2^k$ decoder 100 comprises a first: stage 102, a second stage 104, and a third stage 106. The first stage 102 further comprises a first 2-to-4 decoder 108, a second 2-to-4 decoder 110, a third 2-to-4 decoder 112, and a fourth 2-to-4 decoder 114. The second stage 104 further comprises a plurality of AND-gates (not shown). The third stage 106 further comprises $2^k$ word line drivers (not shown), a first Local Clock Buffer (LCB) 118, a second LCB 120, a third LCB 122, and a fourth LCB 123. There can also be a single or multiple LCBs, as shown in FIG. 1.

In order for the conventional k-to-$2^k$ decoder 100 to operate, there are a series of necessary connections that exist between the first stage 102 and the second stage 104. A first address is inputted into the first 2-to-4 decoder 108 through a first communication channel 126. A second address is inputted into the first 2-to-4 decoder 108 through a second communication channel 128. A third address is inputted into the second 2-to-4 110 decoder through a third communication channel 130. A fourth address is inputted into the second 2-to-4 110 decoder through a fourth communication channel 132. A fifth address is inputted into the third 2-to-4 decoder 112 through a fifth communication channel 134. A sixth address is inputted into the third 2-to-4 decoder 112 through a sixth communication channel 136. A seventh address is inputted into the fourth 2-to-4 decoder 114 through a seventh communication channel 138. An eighth address is inputted into the fourth 2-to-4 decoder 114 through an eighth communication channel 140. The first 2-to-4 decoder 108 is coupled to the second stage 104 through a ninth communication channel 142, a tenth communication channel 144, an eleventh communication channel 146, and a twelfth communication channel 148. The second 2-to-4 decoder 110 is coupled to the second stage 104 through a thirteenth communication channel 150, a fourteenth communication channel 152, a fifteenth communication channel 154, and a sixteenth communication channel 156. The third 2-to-4 decoder 112 is coupled to the second stage 104 through a seventeenth communication channel 158, an eighteenth communication channel 160, a nineteenth communication channel 162, and a twentieth communication channel 166. The fourth 2-to-4 decoder 114 is coupled to the second stage 104 through a twenty-first communication channel 168, a twenty-second communication channel 170, an twenty-third communication channel 172, a twenty-fourth communication channel 174.

Within the convention 2-to-4 decoder 100, there are also a series of other connections. The second stage 104 is couple to the third stage 106 through a twenty-fifth communication channel 176, a twenty-sixth communication channel 178, a twenty-seventh communication channel 180, and a twenty-eighth communication channel 182. Each LCB of the third stage 106 is further connected to a system clock (not shown). The first LCB 118, the second LCB 120 the third LCB 122, and the fourth LCB 123 are coupled to a system clock (not shown) through a twenty-ninth communication channel 184.

The operation of the decoder 100, though, relies on the internal operation of the LCBs 118, 120, 122, and 123 and the word line drivers (not shown) of the third stage 106. Referring to FIG. 2 of the drawings, the reference numeral 200 generally designates the components of the third stage 106 of FIG. 1. The components 200 of the third stage 106 of FIG. 1 comprise an LCB 202 and a word line driver 204. The LCB 202 further comprises a buffer 206 and an inverter 208. The word line driver further comprises a first AND-gate 210, a latch 212, and a second AND-gate 214.

The components operate on the input of various signals, including timing and data signals, into the various components. A systems clock signal is input to the buffer 206 through a first communication channel 220. The output of the buffer 206 is input into an inverter 208 and the second AND-gate 214 through a second communication channel 226. Signals from the second stage 104 of FIG. 1 are input to the first AND-gate 210 through a fourth communication channel 222 and a fifth communication channel 224.

Once all of the system clock signal is input, the word line driver 204 can transmit a word line signal 216 to a memory array (not shown). Additionally, the data signal results from the output of the first AND-gate 210 and the output of the inverter 208. The first AND-gate 210 and the output of the inverter 208 are input into the latch 212 through a sixth communication channel 230 and a seventh communication channel 228, respectively. The inputs into the latch 212 allow the latch to effectively toggle and output a signal to the second AND-gate 214 through an eighth communication channel 232. Also, an LCB, such as LCB 202 of FIG. 2, can drive multiple word line drivers or a single word line driver, as shown in FIG. 2.

A problem, though, exists with power consumption of conventional systems. With conventional systems, a launch clock is required for the LCBs and word line drivers to function. Unfortunately, to insure quick access, a minimum amount of logic is required between the launch clock and the word line, which increases clock loading. Therefore, additional LCBs are required, increasing overall power consumption.

Therefore, there is a need for a method and/or apparatus for reducing power consumption in a decoder that addresses at least some of the problems associated with conventional methods and apparatuses for decoding.

SUMMARY OF THE INVENTION

The present invention provides a final stage of a multi-stage stage decoder. A plurality of word line drivers is provided, wherein the word line drivers at least receive output signals from a first previous stage of the multi-stage stage decoder. There is also a plurality of Local Clock Buffers (LCBs), wherein each LCB of the plurality of LCBs at least receives a system clock signal and at least receives at least one enable signal from a plurality of most significant bits output of a first stage of the multi-stage stage decoder.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electro-magnetic signaling techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or software, or some combinations thereof. In a preferred embodiment, however, the functions are performed by a processor such as a computer or an electronic data processor in accordance with code such as computer program code, software, and/or integrated circuits that are coded to perform such functions, unless indicated otherwise.

Figure 1:
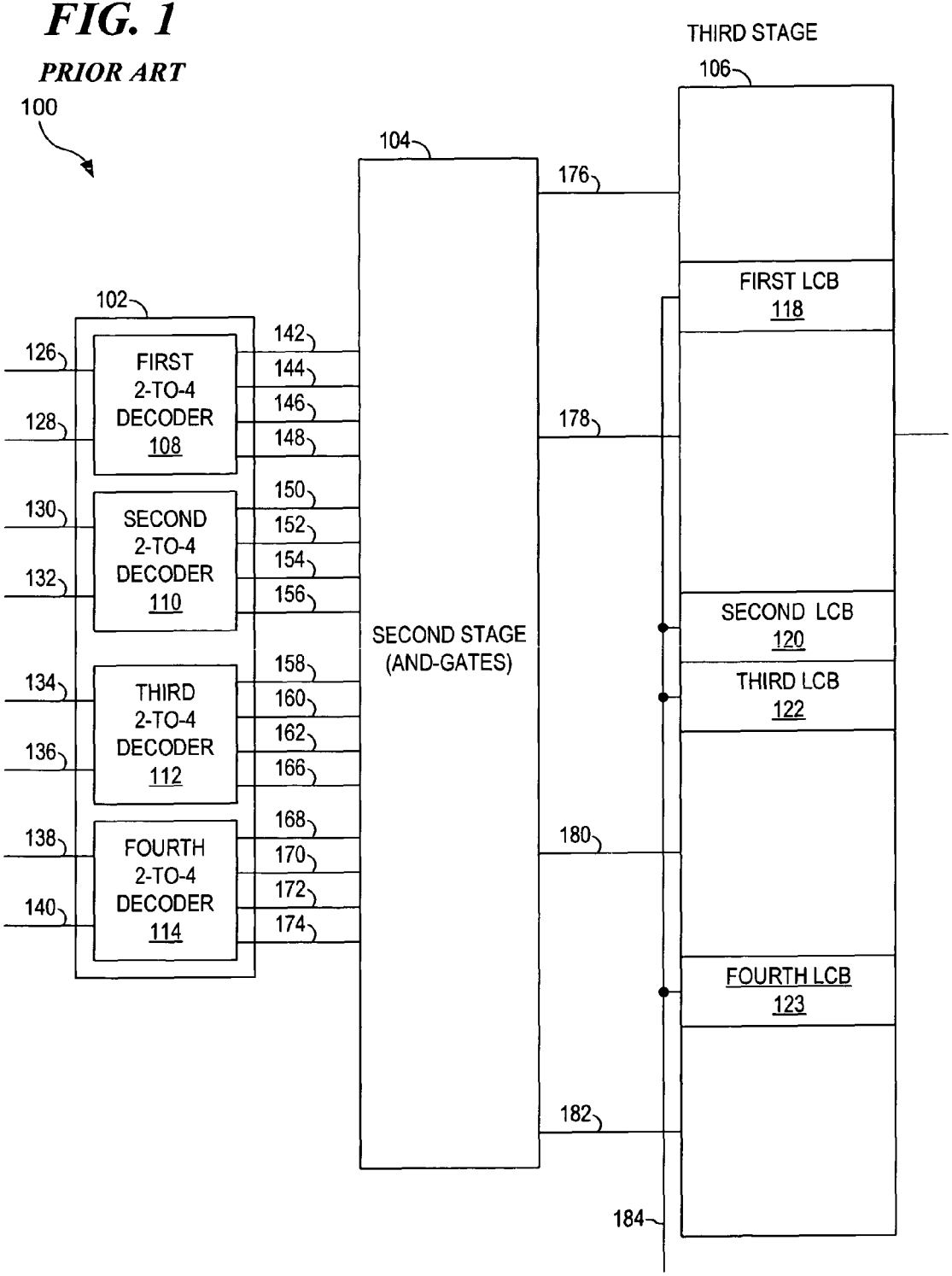
FIG. 1 is a block diagram depicting a conventional k-to-$2^k$ decoder.
Figure 2:
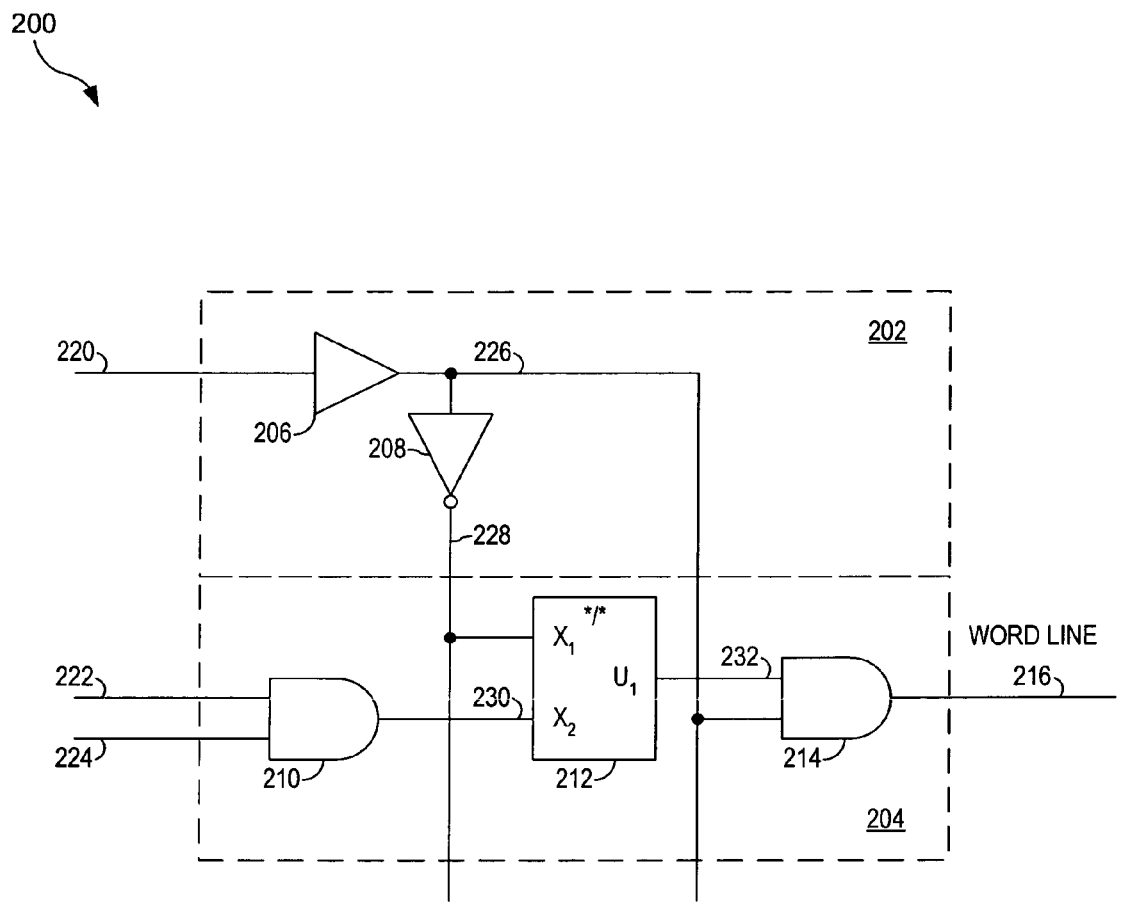
FIG. 2 is a block diagram depicting the components of the third stage of FIG. 1.
Figure 3:
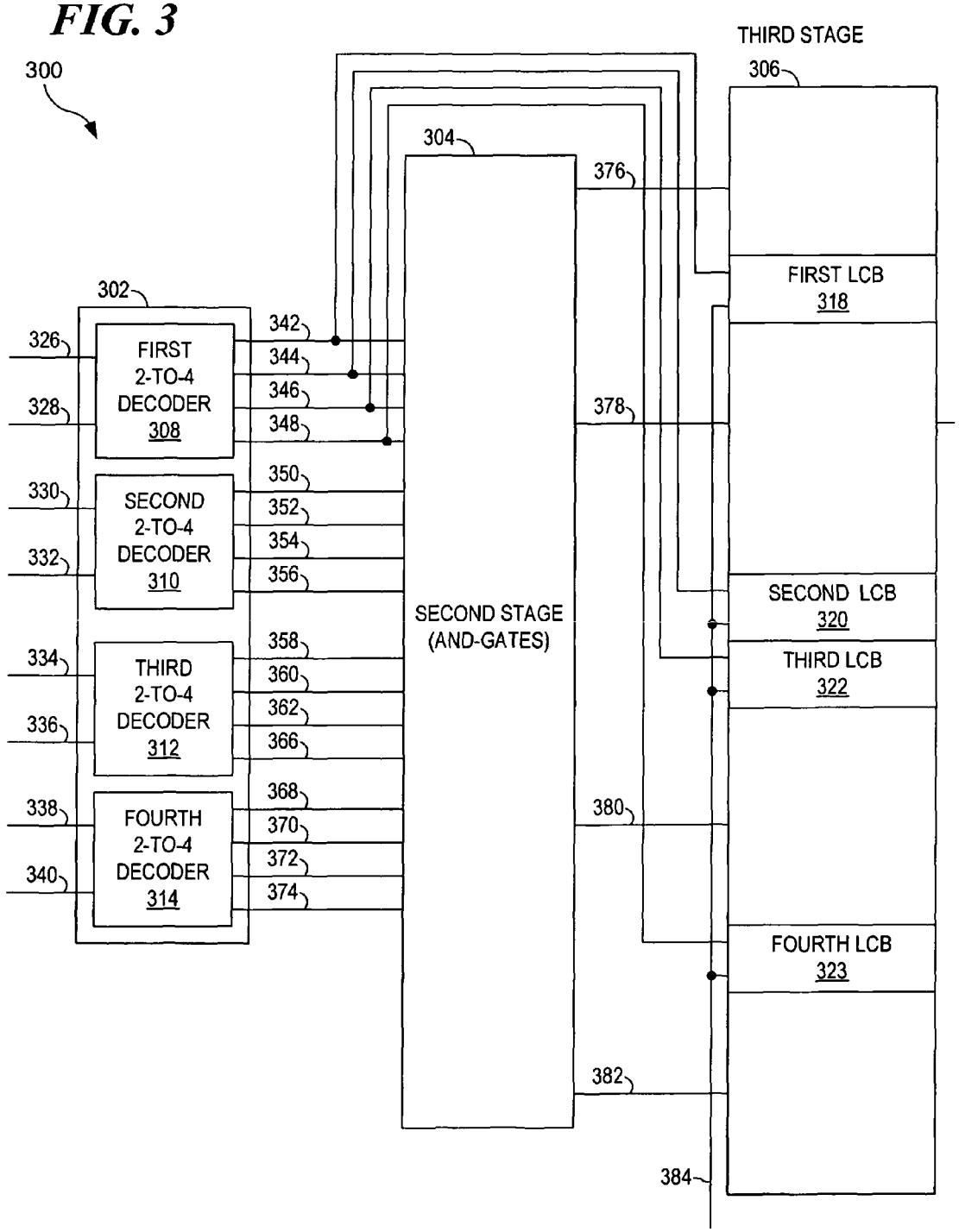
FIG. 3 is a block diagram depicting an improved k-to-$2^k$ decoder.

Referring to FIG. 3 of the drawings, the reference numeral 300 generally designates an improved k-to-$2^k$ decoder. The improved k-to-$2^k$ decoder 300 comprises a first stage 302, a second stage 304, and a third stage 306. The first stage 302 further comprises a first 2-to-4 decoder 308, a second 2-to-4 decoder 310, a third 2-to-4 decoder 312, and a fourth 2-to-4 decoder 314. Also, there are a variety of configurations for the first stage 302. Typically, though, there are k/2 decoders for k inputs. The second stage 304 further comprises a plurality AND-gates (not shown). The third stage 306 further comprises $2^k$ word line drivers (not shown), a first LCB 318, a second LCB 320, a third LCB 322 and a fourth LCB 323. Also, there can be a single or multiple LCBs, as shown in FIG. 3.

In order for the improved k-to-$2^k$ decoder 300 to operate, there are a series of necessary connections that exist between the first stage 302 and the second stage 304. A first address is inputted into the first 2-to-4 decoder 308 through a first communication channel 326. A second address is inputted into the first 2-to-4 decoder 308 through a second communication channel 328. A third address is inputted into the second 2-to-4 310 decoder through a third communication channel 330. A fourth address is inputted into the second 2-to-4 310 decoder through a fourth communication channel 332. A fifth address is inputted into the third 2-to-4 decoder 312 through a fifth communication channel 334. A sixth address is inputted into the third 2-to-4 decoder 312 through a sixth communication channel 336. A seventh address is inputted into the fourth 2-to-4 decoder 314 through a seventh communication channel 338. An eighth address is inputted into the fourth 2-to-4 decoder 314 through an eighth communication channel 340. The first 2-to-4 decoder 308 is coupled to the second stage 304 through a ninth communication channel 342, a tenth communication channel 344, an eleventh communication channel 346, and a twelfth communication channel 348. The second 2-to-4 decoder 310 is coupled to the second stage 304 through a thirteenth communication channel 350, a fourteenth communication channel 352, a fifteenth communication channel 354, and a sixteenth communication channel 356. The third 2-to-4 decoder 312 is coupled to the second stage 304 through a seventeenth communication channel 358, an eighteenth communication channel 360, a nineteenth communication channel 362, and a twentieth communication channel 366. The fourth 2-to-4 decoder 314 is coupled to the second stage 304 through a twenty-first communication channel 368, a twenty-second communication channel 370, an twenty-third communication channel 372, and a twenty-fourth communication channel 374.

Within the convention 2-to-4 decoder 300, there are also a series of other connections. The second stage 304 is couple to the third stage 306 through a twenty-fifth communication channel 376, a twenty-sixth communication channel 378, a twenty-seventh communication channel 380, and a twenty-eighth communication channel 382.

The operation of the decoder, though, relies on the internal operation of the LCBs 318, 320, 322, and 323 and the word line drivers (not shown) of the third stage 306. Data is transmitted to the word line drivers (not shown) of the third stage 306. Also, a system clock signal is transmitted to the first LCB 318, to the second LCB 320, to the third LCB 322, and to the fourth LCB 323 through a twenty-ninth communication channel 384.

In the improved decoder 300, though, enable signals are used. The enable signals are driven by the most significant bits of output of the first stage 302. A first enable signal is communicated from the first 2-to-4 decoder 308 through the ninth communication channel 342. A second enable signal is communicated from the first 2-to-4 decoder 308 through the tenth communication channel 344. A third enable signal is communicated from the first 2-to-4 decoder 308 through the eleventh communication channel 346. A fourth enable signal is communicated from the first 2-to-4 decoder 308 through the twelfth communication channel 348.

Figure 4:
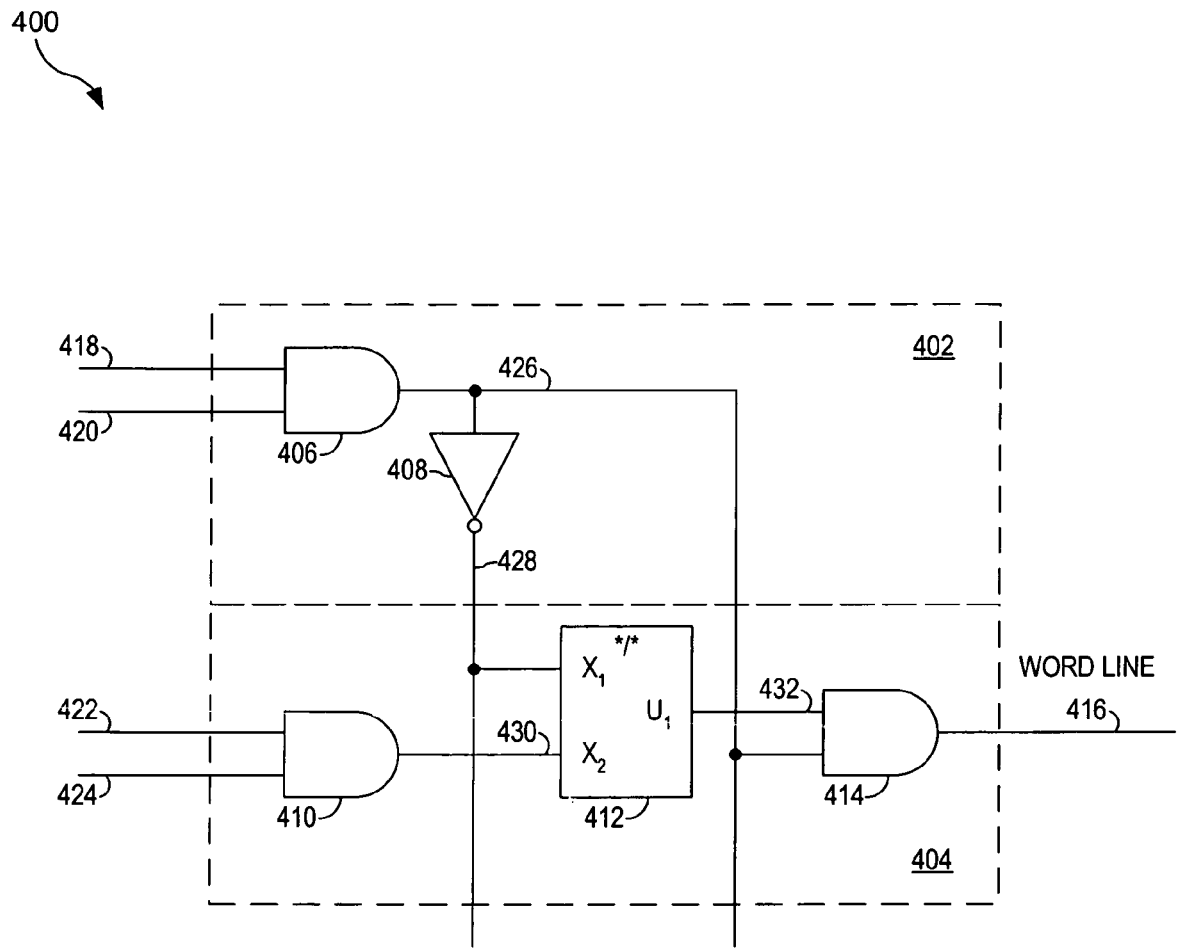
FIG. 4 is a block diagram depicting the components of the third stage of FIG. 3.

Referring to FIG. 4 of the drawings, the reference numeral 400 generally designates the components: of the third stage 306 of FIG. 3. The components 300 of, the third stage 306 of FIG. 3 comprise an LCB 402 and a word line driver 404. The LCB 402 further comprises a first AND-gate 406 and an inverter 408. The word line driver further comprises a second AND-gate 410, a latch 412, and a third AND-gate 414.

The components operate on the input of various signals, including timing and data signals, into the various components. An enable signal is input to the first AND-gate 406 through a first communication channel 418. Also, a systems clock signal is input to the first AND-gate 406 through a second communication channel 420. The output of the first AND-gate 206 is input into an inverter 408 and the third AND-gate 414 through a third communication channel 426. Signals from the second stage 304 of FIG. 3 are input to the second AND-gate 410 through a fourth communication channel 422 and a fifth communication channel 424. Also, an LCB, such as LCB 402 of FIG. 4, can drive multiple word line drivers or a single word line driver, as shown in FIG. 4.

Once all of the clock signal and the launch clock signals are engaged, the word line driver 404 can transmit a word line signal 416 to a memory array. Additionally, the data signal results from the output of the second AND-gate 410 and the output of the inverter 408. The second AND-gate 410 and the output of the inverter 408 are input into the latch 412 through a sixth communication channel 430 and a seventh communication channel 428, respectively. The inputs into the latch 412 allow the latch to effectively toggle and output a signal to the third AND-gate 414 through an eighth communication channel 432.

By communicating enable signals of the most significant bits of output of the first stage 302 of FIG. 3 to the LCBs 318, 320, 322, and 323 of FIG. 3, overall power consumption can be reduced because the LCBs 318, 320, 322, and 323 of FIG. 3 are equivalent to the LCB 402 of FIG. 4. The most significant bits of output of the first stage 302 determine which groupings of word lines will be in operation to access a memory array. This method reduces power consumption by limiting the switching of all nodes to only fraction being active at a given time. In other words, power consumption by the clocks can be reduced by up to 75%.

It will further be understood from the foregoing description that various modifications and changes may be made in the preferred embodiment of the present invention without departing from its true spirit. This description is intended for purposes of illustration only and should not be construed in a limiting sense. The scope of this invention should be limited only by the language of the following claims.

What is claimed is:

1. A final stage of a multi-stage stage decoder coupled to a memory array, said final stage comprising:
   a first stage, a second stage and the final stage each being configured as part of said multi-stage stage decoder;
   a local clock buffer comprising a gate configured to receive an enable signal from the first stage and a clock signal;
   an enable input from a communication channel connecting a most significant bit output of the first stage to a gate of the local clock buffer to communicate the enable signal from the first stage to the local clock buffer;
   a word line driver configured to receive at least one data input from the second stage and further configured to receive at least two output signals from said gate of the local clock buffer, said two output signals comprising a first enable output of the gate and a second inverted enable output of the gate; and
   a latch configured as part of said word line driver and arranged to be enabled by said second inverted enable output of the gate to communicate a word line signal to a memory array.

2. The final stage of claim 1, wherein said gate of the local clock buffer is a first gate, the final stage further comprising:
   a second gate configured as part of said word line driver to receive said at least one data input from the second stage, an output of the second gate being coupled to the latch.

3. The final stage of claim 2, further comprising:
   a third gate configured as part of said word line driver to receive said first enable output of the first gate, an output of the third gate being coupled to said memory array.

4. The final stage of claim 3, further comprising:
   an inverter coupled to an output of the first gate provides the second inverted enable output of the first gate to the latch.

5. The final stage of claim 4, wherein the first gate, the second gate and the third gate are AND gates.

6. The final stage of claim 1, wherein arranging said latch to be enabled by the second inverted enable output of the gate to communicate a word line signal to a memory array reduces power consumption of the multi-stage stage decoder.

7. The final stage of claim 1, wherein said word line signal received by the memory array is based upon the at least one data input.

8. The final stage of claim 7, further comprising:
   an output coupled to said memory array configured to output said word line signal.

9. A method of decoding in a final stage of a multi-stage stage decoder coupled to a memory array, said method comprising:
   providing a first stage connected to a second stage, the second stage being connected to the final stage of said multi-stage stage decoder;
   sending a clock signal from the first stage to a local clock buffer of the final stage, said local clock buffer comprising a gate;
   communicating an enable signal from the first stage to the local clock buffer via an enable input of the final stage, wherein the enable signal is from a communication channel connecting a most significant bit output of the first stage to said gate of the local clock buffer;
   receiving, at a word line driver, at least one data input from the second stage;
   receiving, at said word line driver, at least two output signals from said gate of the local clock buffer, said two output signals comprising a first enable output of the gate and a second inverted enable output of the gate;
   enabling a latch configured as part of said word line driver, said latch being enabled by said second inverted enable output of the gate; and
   communicating a word line signal to a memory array in response to enabling said latch.

10. The method of claim 9, wherein said gate of the local clock buffer is a first gate, the method further comprising:
    receiving, at a second gate configured as part of said word line driver, said at least one data input from the second stage;
    wherein an output of the second gate is coupled to the latch.

11. The method of claim 10, wherein said word line driver comprises a third gate with an output coupled to said memory array, the method further comprising:
    receiving, at the third gate, said first enable output of the first gate.

12. The method of claim 11, further comprising:
    providing the second inverted enable output of the first gate from an inverter coupled to an output of the first gate to the latch.

13. The method of claim 12, wherein the first gate, the second gate and the third gate are AND gates.

14. The method of claim 9, wherein the communicating of the word line signal to said memory array in response to enabling said latch reduces power consumption of the multi-stage stage decoder.

15. The method of claim 9, wherein the word line signal communicated to the memory array is based upon the at least one data input.

16. The method of claim 9, further comprising:
    outputting said word line signal from an output coupled to said memory array.

* * * * *